United States Patent
Best et al.

(10) Patent No.: US 9,573,201 B2
(45) Date of Patent: Feb. 21, 2017

(54) VACUUM DRILLING SYSTEM AND METHODS

(71) Applicant: ALLIED MACHINE & ENGINEERING CORP., Dover, OH (US)

(72) Inventors: Paul W. Best, Mercer, PA (US); Richard D. Polilli, Gnadenhutten, OH (US); David J. Carlisle, New Philadelphia, OH (US)

(73) Assignee: Allied Machine & Engineering Corp., Dover, OH (US)

( * ) Notice: Subject to any disclaimer, the term of this patent is extended or adjusted under 35 U.S.C. 154(b) by 95 days.

(21) Appl. No.: 14/287,312

(22) Filed: May 27, 2014

(65) Prior Publication Data

US 2014/0356087 A1    Dec. 4, 2014

Related U.S. Application Data

(60) Provisional application No. 61/828,056, filed on May 28, 2013.

(51) Int. Cl.
*B23B 51/06* (2006.01)

(52) U.S. Cl.
CPC ............ *B23B 51/06* (2013.01); *B23B 2251/50* (2013.01); *B23B 2251/68* (2013.01); *Y10T 408/03* (2015.01); *Y10T 408/04* (2015.01); *Y10T 408/453* (2015.01)

(58) Field of Classification Search
CPC .. B23B 51/06; B23B 2251/68; B23B 2251/62; B23C 2230/045; B23C 2230/08; Y10T 408/453

See application file for complete search history.

(56) References Cited

U.S. PATENT DOCUMENTS

| | | | |
|---|---|---|---|
| 994,430 A | | 3/1911 | Tunks |
| 1,281,420 A | * | 10/1918 | Reid ................... B23B 51/0486 |
| | | | 29/DIG. 68 |
| 2,028,580 A | | 1/1936 | Yedd |

(Continued)

FOREIGN PATENT DOCUMENTS

| | | |
|---|---|---|
| DE | 3143847 A1 | 5/1983 |
| DE | 3212475 A1 * | 11/1983 ............. B23B 47/34 |

(Continued)

OTHER PUBLICATIONS

International Searching Authority/RU, International Application No. PCT/US14/39500 International Search Report/Written Opinion, Sep. 25, 2014, 6 pages, Moscow Russia.

(Continued)

*Primary Examiner* — Daniel Howell
*Assistant Examiner* — Ryan Rufo
(74) *Attorney, Agent, or Firm* — Hahn Loeser + Parks LLP; Scott M. Oldham, Esq.

(57) ABSTRACT

A vacuum drilling system and methods is provided that may utilize both a through tool coolant supply as well as a central vacuum extraction system. The system may include a cutting head provided on a hollow tube and a vacuum source to apply vacuum pressure to the area of the cutting head via one or more chip inlets arranged proximate to the cutting head. Sealed coolant containment channels supply coolant to the area of the cutting head.

14 Claims, 7 Drawing Sheets

(56) References Cited

U.S. PATENT DOCUMENTS

| | | | |
|---|---|---|---|
| 2,708,852 A | 5/1955 | Wohlfahrt |
| 2,895,355 A | 7/1959 | Kleine |
| 3,022,840 A | 2/1962 | Hohos et al. |
| 3,032,129 A | 5/1962 | Fletcher et al. |
| 3,085,453 A | 4/1963 | Mossberg |
| 3,089,552 A | 5/1963 | Black et al. |
| 3,144,912 A | 8/1964 | Boehm et al. |
| 3,307,243 A | 3/1967 | Andreasson |
| 3,555,937 A | 1/1971 | Nicodemas |
| 3,694,099 A | 9/1972 | Nicholas |
| 4,097,176 A | 6/1978 | Wanner et al. |
| 4,190,128 A | 2/1980 | Emmerich |
| 4,209,069 A | 6/1980 | Smith |
| 4,313,506 A | 2/1982 | O'Connell |
| 4,330,044 A | 5/1982 | Orr et al. |
| 4,368,789 A | 1/1983 | Orr et al. |
| 4,515,230 A | 5/1985 | Means et al. |
| 4,605,079 A | 8/1986 | Leibee et al. |
| 4,625,593 A | 12/1986 | Schmotzer |
| 4,627,503 A | 12/1986 | Horton |
| 4,628,584 A | 12/1986 | Clark et al. |
| 4,711,312 A | 12/1987 | Leibee et al. |
| 4,711,609 A | 12/1987 | Seefluth |
| 4,964,476 A | 10/1990 | Fischer |
| 5,033,917 A | 7/1991 | McGlasson et al. |
| 5,378,091 A | 1/1995 | Nakamura |
| 5,451,126 A | 9/1995 | Brun |
| 5,452,628 A | 9/1995 | Montgomery, Jr. et al. |
| 5,478,176 A | 12/1995 | Stedt et al. |
| 5,487,630 A | 1/1996 | Campian |
| 5,630,682 A | 5/1997 | Davey |
| 5,904,453 A | 5/1999 | Gavia |
| 6,086,292 A | 7/2000 | Yokoyama |
| 6,595,305 B1 | 7/2003 | Dunn et al. |
| 7,018,145 B2 | 3/2006 | Mast et al. |
| 7,563,060 B2 | 7/2009 | Kesterson et al. |
| 7,572,088 B2* | 8/2009 | Biscay .................. B23B 51/048 408/225 |
| 8,083,445 B2 | 12/2011 | Hyatt et al. |
| 8,388,279 B2 | 3/2013 | Kitsukawa |
| 8,622,661 B2 | 1/2014 | Inamasu |
| 2003/0170082 A1 | 9/2003 | Garcia et al. |
| 2005/0100420 A1 | 5/2005 | Mast et al. |
| 2005/0249561 A1* | 11/2005 | Clark .................. B23Q 11/0046 408/204 |
| 2007/0086867 A1* | 4/2007 | Kesterson ............... B23B 51/06 408/59 |
| 2009/0297285 A1 | 12/2009 | Nomura et al. |
| 2010/0003097 A1 | 1/2010 | Kitsukawa |
| 2010/0166510 A1 | 7/2010 | Inamasu et al. |

FOREIGN PATENT DOCUMENTS

| | | | | |
|---|---|---|---|---|
| EP | 1475174 A1 | * | 11/2004 | ......... B23B 51/0486 |
| JP | 60-259303 A | * | 12/1985 | ............. B23B 41/02 |
| JP | 01092007 A | * | 4/1989 | ............. B23B 29/03 |
| JP | 2003-011115 A | * | 1/2003 | ............... B28B 1/14 |
| JP | 2005-145041 A | * | 6/2005 | ............... B28B 1/14 |
| WO | 9404303 | | 3/1994 | |

OTHER PUBLICATIONS

Intellectual Property Office of Singapore, Written Opinion, Jun. 10, 2016, 6 pages, Intellectual Property Office of Singapore, 51 Bras Basah Road, #01-01 Manulife Centre, Sinapore 189554, e-mail: operation@iposinternational.com.

* cited by examiner

VACUUM DRILLING SYSTEM AND METHODS

CROSS-REFERENCE TO RELATED APPLICATION

This U.S. patent application claims the benefit of and priority to U.S. Provisional Patent Application Ser. No. 61/828,056, filed May 28, 2013, which is incorporated herein by reference in its entirety.

FIELD OF THE INVENTION

The present invention relates to the field of drilling, and in particular, to vacuum drilling systems, which provide for the collection of chips generated by the drilling process by an applied vacuum, while also allowing for through tool coolant application.

BACKGROUND INFORMATION

In various industries and applications, drilling of materials may be performed using solid twist drill designs. In the aerospace industry for example, to successfully drill the various metals used in the industry, solid twist drills provide desired capabilities, such as being precise. This style of tooling may have through coolant capability and the coolant outlets typically exit on the clearance angle of the cutting geometry at the nose of the tool. As chips are created during the drilling cycle, the flute helix and coolant pressure work to evacuate chips through the flutes. Once the chips and coolant exit the hole, they are released into the environment.

In some applications and environments, the components may require the use of portable drilling machines to allow drilling of multiple holes at different locations. For example, in the aerospace industry, the components may be very large and require portable drilling machines that can be moved to the different hole locations on the component. The portable drilling machines are compact and do not provide any enclosure to isolate the drilling process from the outside environment. This results in the release of chips and coolant into the environment when utilizing solid twist drills. Because the chips evacuated from the hole are not contained, additional process time is required in order to remove the chips and coolant from the component and drilling environment. Additionally, failure to contain the chips and coolant flow may cause health and safety hazards for drill operators.

Additionally, the generation of chips during the drilling of various materials requires the chips to be conveyed away from the cutting features of the drill, or the chips can impede the drilling process and/or cause damage to the drill. For certain materials, such as composite materials including carbon fiber reinforced plastic (CFRP), for example, there have been developed drilling systems which use a vacuum to remove the large quantities of fine chips created when drilled. Without effective removal of the chips thus generated, chip compaction often occurs, reducing the drill's ability to cut, increasing the generation of heat, and reducing the life of the drill. The cooling effect and force originating from a vacuum applied to the drill is sufficient for providing the needed heat dissipation and chip extraction in CFRP material. This results in a reliable drilling process for CFRP that utilizes an applied vacuum.

A need still exists for a reliable vacuum drilling system that can perform in metal drilling applications. The properties of various metals can be considerably different from one another, and are different than the properties of CFRP. For example, in materials such as titanium and aluminum, it would be desirable to facilitate removal of chips using an applied vacuum, but with metallic materials, the prior vacuum systems for CFRP materials are not designed to be used on such materials. It would be worthwhile to provide a vacuum drilling system which may be used for metallic or other materials, to effectively remove chips during the drilling process.

In addition to requiring effective chip removal, it is also desirable that the drilling operation be precise, to provide repeatable machining to close tolerances and desired specifications.

In the machining operation to drill metallic, composite or other materials, it would be desirable to provide a drilling system and methods to effectively remove chips formed during the drilling operation. There is also a need to provide a drilling system and methods to effectively provide coolant to the cutting surfaces while allowing for the effective removal of chips formed during the drilling operation.

SUMMARY OF THE INVENTION

The present invention provides a vacuum drilling system for a drilling operation that utilizes both a through tool coolant supply as well as a central vacuum extraction system. In an example, the drilling system includes a generally cylindrical body member and a cutting head at the front end of the body member having at least one cutting edge formed thereon. The body member forms a hollow shaft adjacent the cutting head with at least one opening formed in the body member adjacent the cutting head. A coolant adapter provided on the body member provides a coolant fluid through at least one sealed channel in the body member exterior to the hollow shaft, to provide the coolant fluid to the area of the at least one cutting edge. A vacuum connected to the hollow shaft applies vacuum pressure through the at least one opening and hollow shaft. The through tool coolant system is provided by a sealed coolant containment channels situated around a hollow interior channel that remains unrestricted and is sized to efficiently extract chips formed during a drilling operation. The invention can be used in drilling operations wherein chips formed during drilling are vacuum extracted and coolant is supplied to promote heat dissipation and chip removal and maximize the precision of the drilling operation while increasing tool life.

The present invention also provides a method of performing a drilling operation comprising providing a drilling tool having a cutting head adjacent a front end of the drilling tool having at least one cutting edge formed thereon. The drilling tool also includes a hollow shaft with at least one opening formed adjacent the cutting head. A coolant adapter is provided on the body member to provide a coolant fluid through at least one sealed channel in the body member exterior to the hollow shaft. A vacuum source is coupled to the hollow tube to extract cuttings formed at the cutting head. The through tool coolant system is provided by at least one sealed coolant containment channel situated around a hollow interior channel that remains unrestricted and is sized to efficiently extract chips formed during a drilling operation.

These and other features and advantages of the present invention will be apparent to those of skill in the art in view of the following written description and drawings.

DETAILED DESCRIPTION

Figure 1:
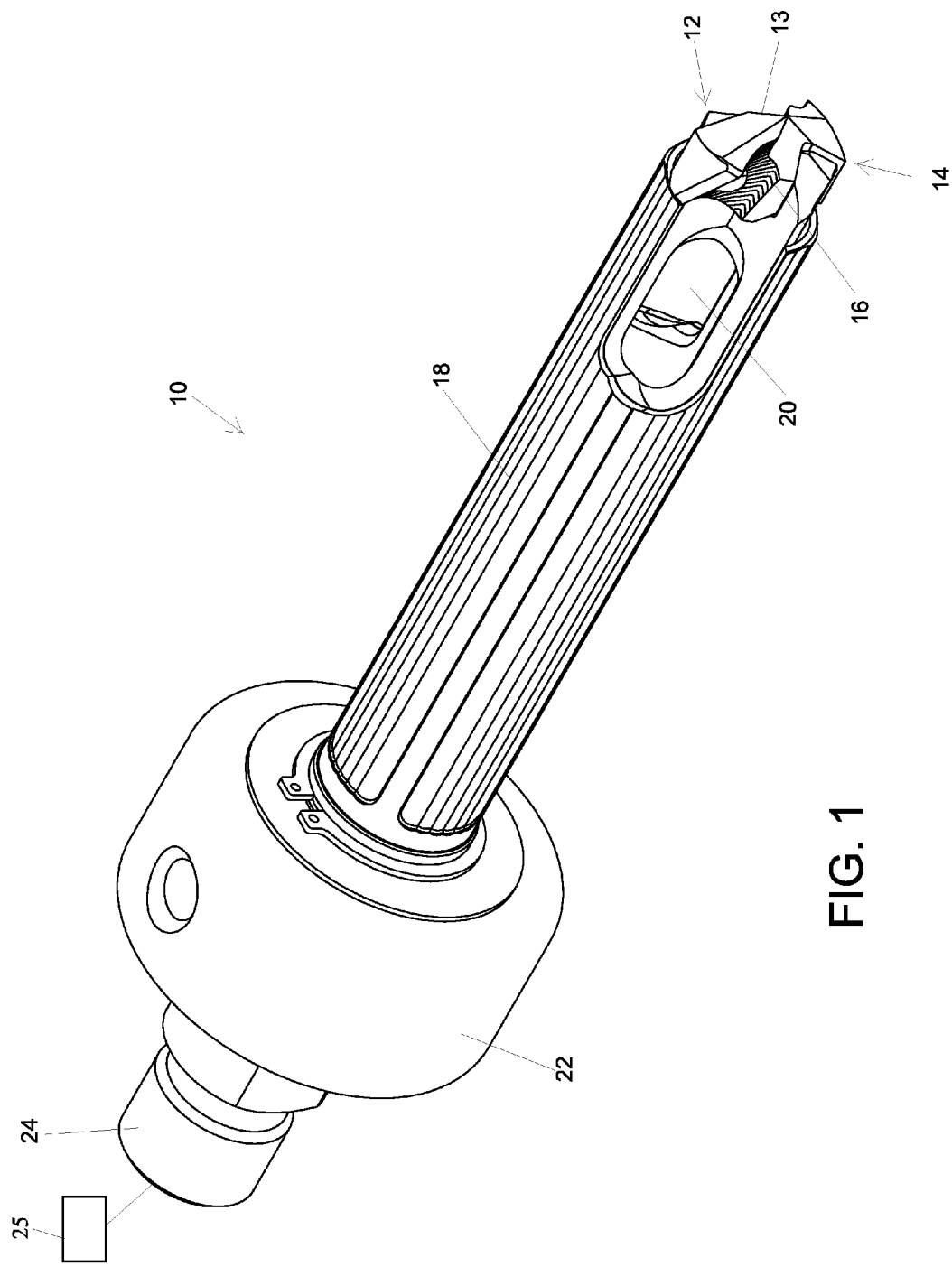
FIG. 1 shows a perspective view of an example of a vacuum drilling system in accordance with the present invention.
Figure 2:
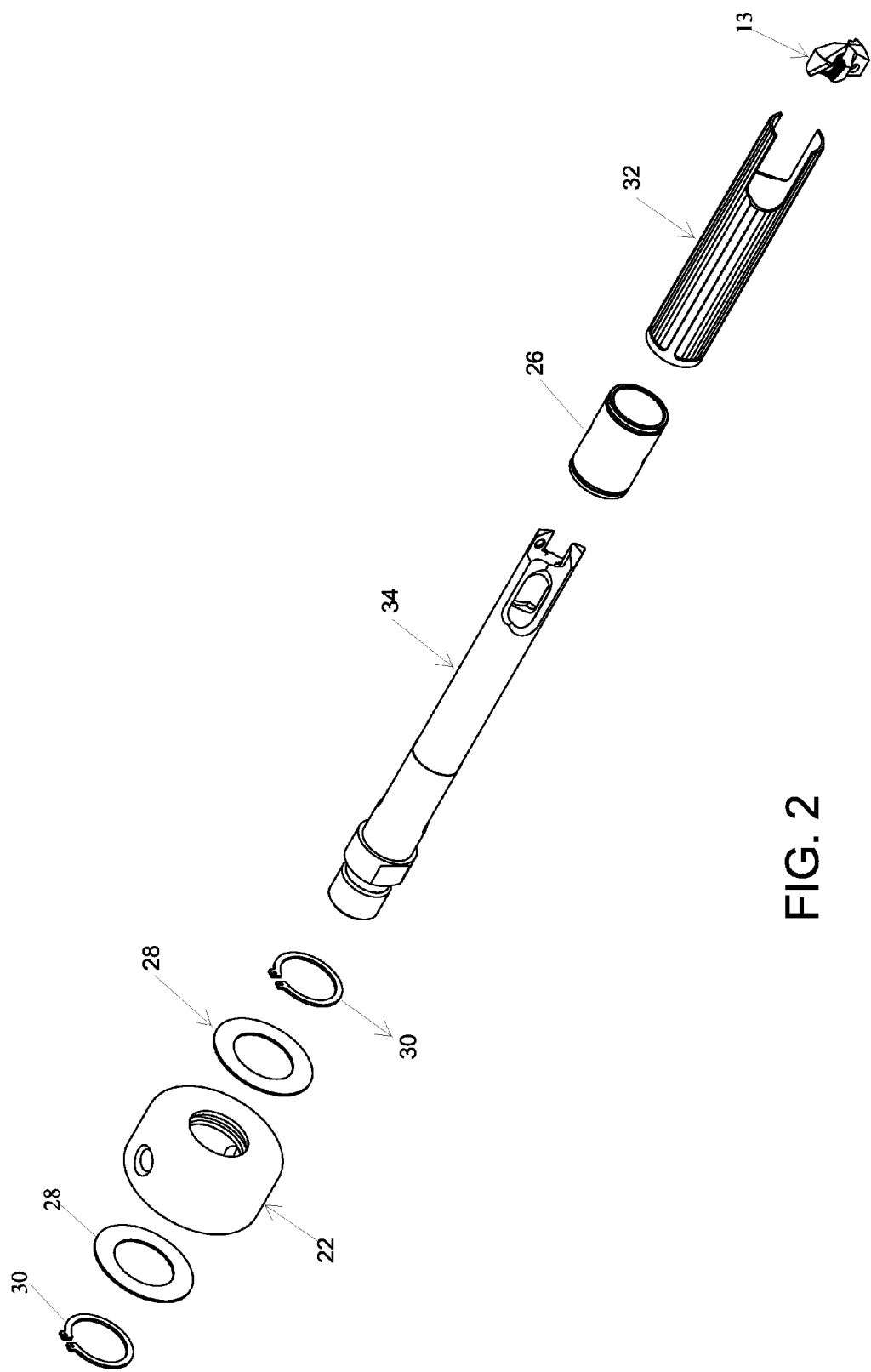
FIG. 2 shows an exploded perspective view the example of FIG. 1.

An example of a vacuum drilling system 10 in accordance with the present invention is shown in FIGS. 1 and 2. The vacuum drilling system 10 for performing a drilling operation may include a variety of features and attributes to promote heat dissipation and chip removal, and maximize the precision of the drilling operation while increasing tool life. The vacuum drilling system 10 utilizes both a through tool coolant supply as well as a central vacuum extraction system. In this example, the system may include a cutting head 12 adjacent a front end 14 of the system, having at least one cutting edge 16 formed thereon. A hollow shaft 18 is provided with at least one front hole or opening 20 adjacent the cutting head 12. A rotary coolant adapter 22 is provided on the shaft 18 adjacent at least one rear opening 24. A vacuum source 25 is connected to apply vacuum pressure in the formed hole as will be described hereafter. Vacuum pressure is applied through the openings 20 and hollow shaft 18. The invention can be used in drilling operations wherein chips formed during drilling are vacuum extracted and coolant is supplied to the area of cutting head 12. In this example, the cutting head 12 may include a replaceable cutting insert 13, such as a blade-type insert, but other cutting geometries and configurations may be used depending on the application. The replaceable cutting insert 13 will be assembled to the cutting end of the hollow inner body 18, using torx screws in a slotted connection or other suitable configuration. Other systems to apply vacuum to the hollow shaft 18 may be used and are contemplated in the invention.

Figure 3:
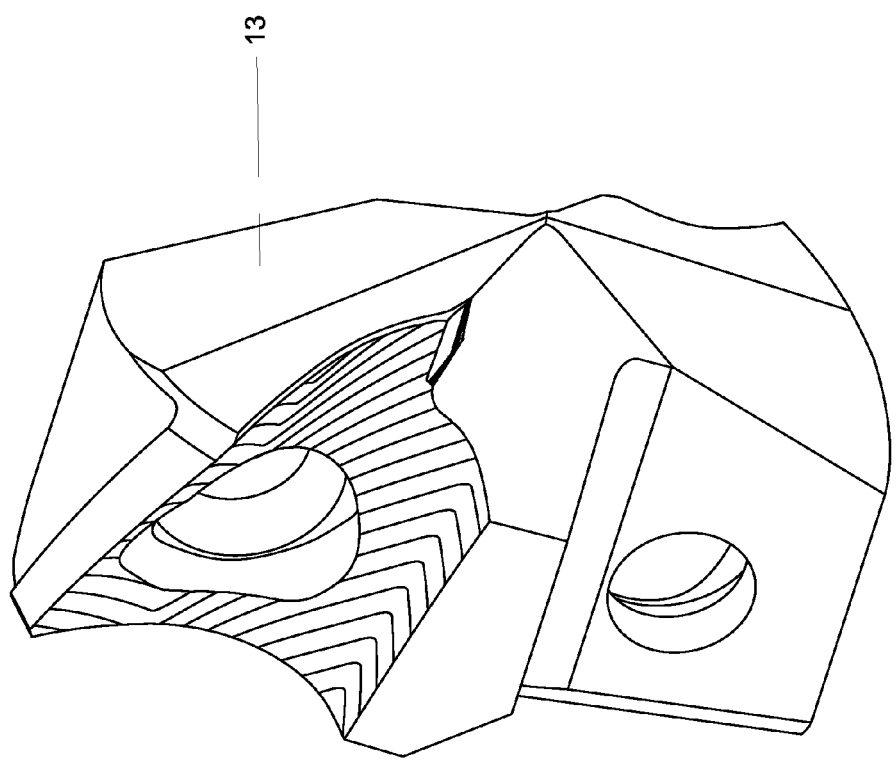
FIG. 3 is a perspective view of a cutting insert according to an example of the drilling system.

In cutting of metallic materials, the cutting insert 13 may generally be made of a carbide substrate, and a coated outer surface for improved insert performance. The specific substrate and coating used is dependent on the application of the drill, and any suitable substrate may be used, as well as optionally any coating or other treatment thereof. The substrate may have the wearability required for acceptable insert life while drilling and also have the toughness to not fail prematurely. A coating may be used to provide increased wear and heat resistance to the substrate. Proper coating may be helpful in the drilling of aerospace metals, as these metals can be very abrasive and generate high amounts of heat while cutting. The cutting insert 13, being replaceable in the example shown, allows for cost-effective performance in exchanging inserts when one becomes worn. As shown in FIG. 3, in this example, the insert 13 is double effective, and has a cutting geometry determined by the application of the drill. Proper insert cutting geometry may be designed to form a desired chip type, for effective evacuation using coolant and vacuum drilling of metal materials. The cutting geometry produces desired chip formation and hole quality. In the aerospace and other industries, continuous chip forming metal materials are common, and the cutting geometry can be configured to assist in creating small segmented chips. In the aerospace and other industries, the nature of the metal materials used, such as lightweight materials like aluminum or the like, as well as the nature of the parts, present significant challenges to performing drilling in an effective manner. Due to the large size of parts for example, portable drilling systems such as positive feed peck drills may be used, such as Quackenbush tools produced by Cooper Power Tools. The cutting geometry provided in the drilling system 10 provides the production of small chips in conjunction with the action of the drilling tool, to allow for effective removal of the chips in the vacuum drilling operation. The cutting geometry creates small segmented chips in conjunction with positive feed and peck drilling operation. The ability to form the desired chip configuration in conjunction with the drilling tool ensures the chips can be properly extracted from the hole 20 through the hollow inner body 18. In the example, the positive feed peck drill or another system to allow for a hammering effect along with positive feed, can assist in formation of chips in a desired configuration. The cutting geometry can also provide optimized feed rates in conjunction with such drilling systems.

As seen in FIG. 2, the rotary coolant adapter 22 is assembled to the outside diameter (OD) of a coolant inducer sleeve 26 and retained using thrust washers 28 and snap rings 30 for example. An external coolant supply is plumbed into the rotary coolant adapter 22 enabling coolant to flow through the sealed components, including a coolant containment sleeve 32 which is mated to the hollow inner body 34 and coolant inducer sleeve 26 to create a sealed route for coolant flow to the cutting insert 13. The coolant inducer sleeve 26 is mated to the hollow inner body 34 and coolant containment sleeve 32 to provide a location for connection of an external coolant supply. The coolant may be any suitable material, such as air with atomized lubricant, or other suitable coolant/lubricant fluids.

Figure 4:
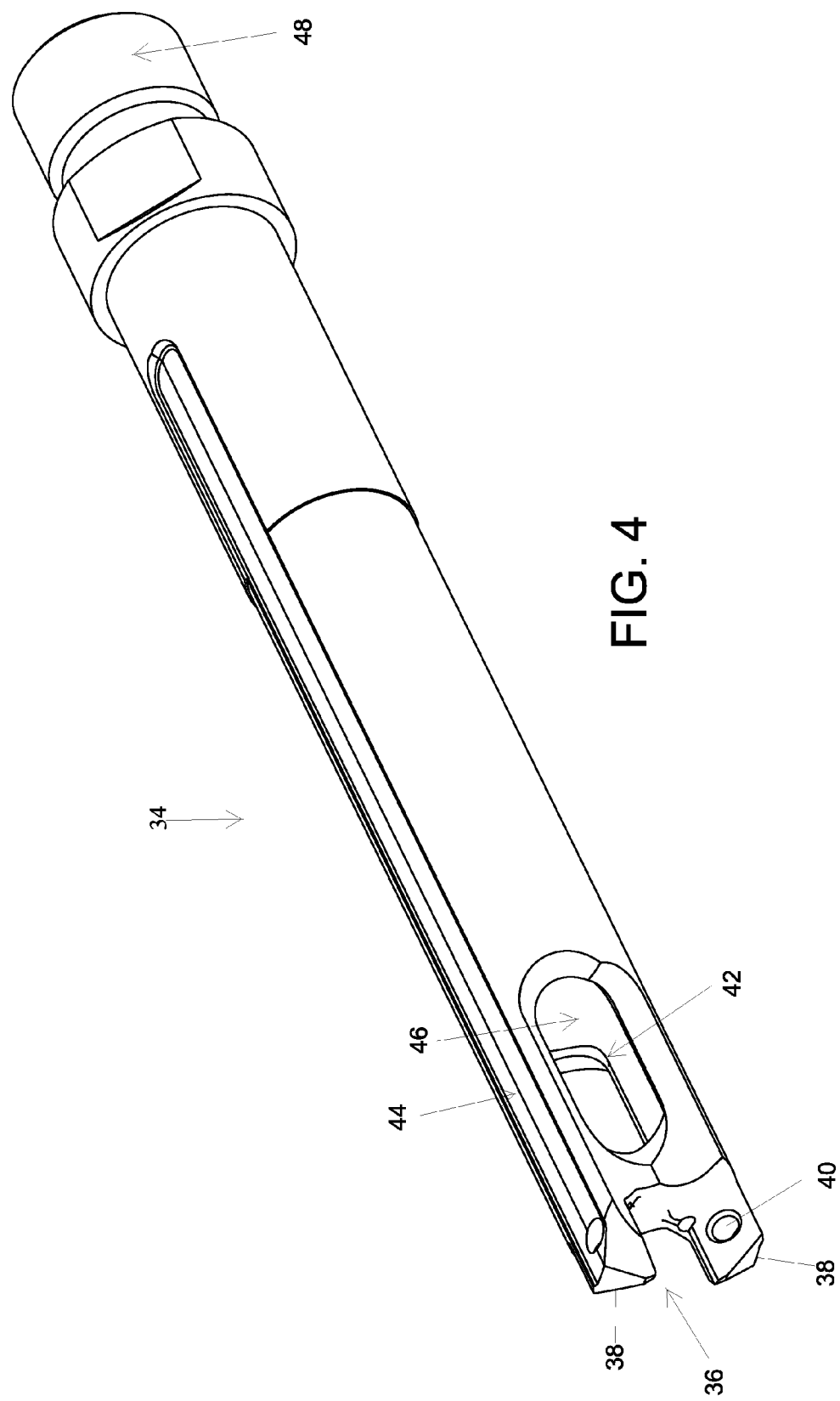
FIG. 4 is a perspective view of the hollow inner body according to an example of the drilling system.

Turning to FIG. 4, the hollow inner body 34 is shown in more detail, and in this example, includes a slotted insert connection 36 for securing the insert 13 in the proper position for drilling. This connection 36 drives the cutting insert 13 and allows for easy replacement of worn inserts 13. The slotted connection 36 includes two ear portion 38, with holes 40 through which torx screws or the like extend and engage the cutting insert 13. The slotted connection 36 also allows for one drill body to be used with a variety of different cutting geometries, providing significant flexibility and effectiveness. In conjunction with a drill bushing 70 as previously described, the diameter of the insert 13 may be consistent with the diameter of the holder, or otherwise, different diameter inserts could possibly be used with a common holder. The slotted connection 36 may be similar to other tooling produced by Allied Machine & Engineering Corporation, and can be made to accept Gen3Sys® inserts or T-A® inserts produced by Allied Machine & Engineering Corporation. Other connections or inserts may be used as desired.

The hollow inner body 34 also includes chip extraction openings 42. The chip extraction openings 42 provide an entrance for chips into the central extraction hole. There is one opening 42 dedicated for each cutting edge on the cutting insert 13 and located near each cutting edge to effectively withdraw formed chips. The applied vacuum force will flow through these extraction openings 42 to aid in removal of chips from the drilled hole. On the exterior of the hollow inner body there are provided through coolant channels 44. The through coolant channels 44 work to provide an area inside the sealed components of the drill dedicated for coolant flow axially to the cutting insert 13.

The design of the through coolant channels 44 provides the ability to effectively supply coolant to the cutting edges of the insert 13, and to then allow effective removal of formed chips in conjunction with the applied vacuum source, thereby enhancing the overall performance of the drill. Utilizing this coolant route results in a coolant through system that can be located near the outer diameter of the tool body. With the coolant routed in this location, sufficient area is created within the hollow inner body 34 for desired central extraction hole 46 size. Other through coolant design options can restrict the size of the central extraction hole 46, resulting in a drill design incapable of extracting even ideal-sized metal chips.

Additionally, pressure from the through coolant flow works with the applied vacuum force to increase the drill's ability to extract chips. The design is highly reliable and removes chips from the hole at a faster rate. This can allow for drilling at higher penetration rates, while maintaining an adequate chip extraction rate. The central extraction hole 46 runs axially through the tool body to provide an area for chip extraction. This hole 46 meets with the chip extraction openings 42 near the cutting insert 13 and continues to the shank end of the drill to provide an exit location for chips. As holes are drilled, chips and coolant fluid enters the central extraction hole 46 through the chip extraction openings 42 and travel through the central extraction hole 46 to exit out of the rear of the shank 48. It is desired for the size of the central extraction hole 46 to be configured to allow for proper chip extraction and proper function of the drill to achieve high penetration rates and increase production capabilities. If the central extraction hole 46 is too small, it may not efficiently extract chips at the proper rate, which may result in tool failure due to chip packing at the nose of the drill. The pressure of the vacuum source and/or coolant supply may be varied if desired, and the size or configuration of the central extraction hole 46 may be varied to achieve the desired chip extraction characteristics.

In this example, the tool hollow inner body 34 includes a shank 48, that provides an area for connection to a motor that drives the drill. Shank design can vary, and is determined by the connection required by the motor spindle in the application. Any suitable shank design may be used.

Figure 5:
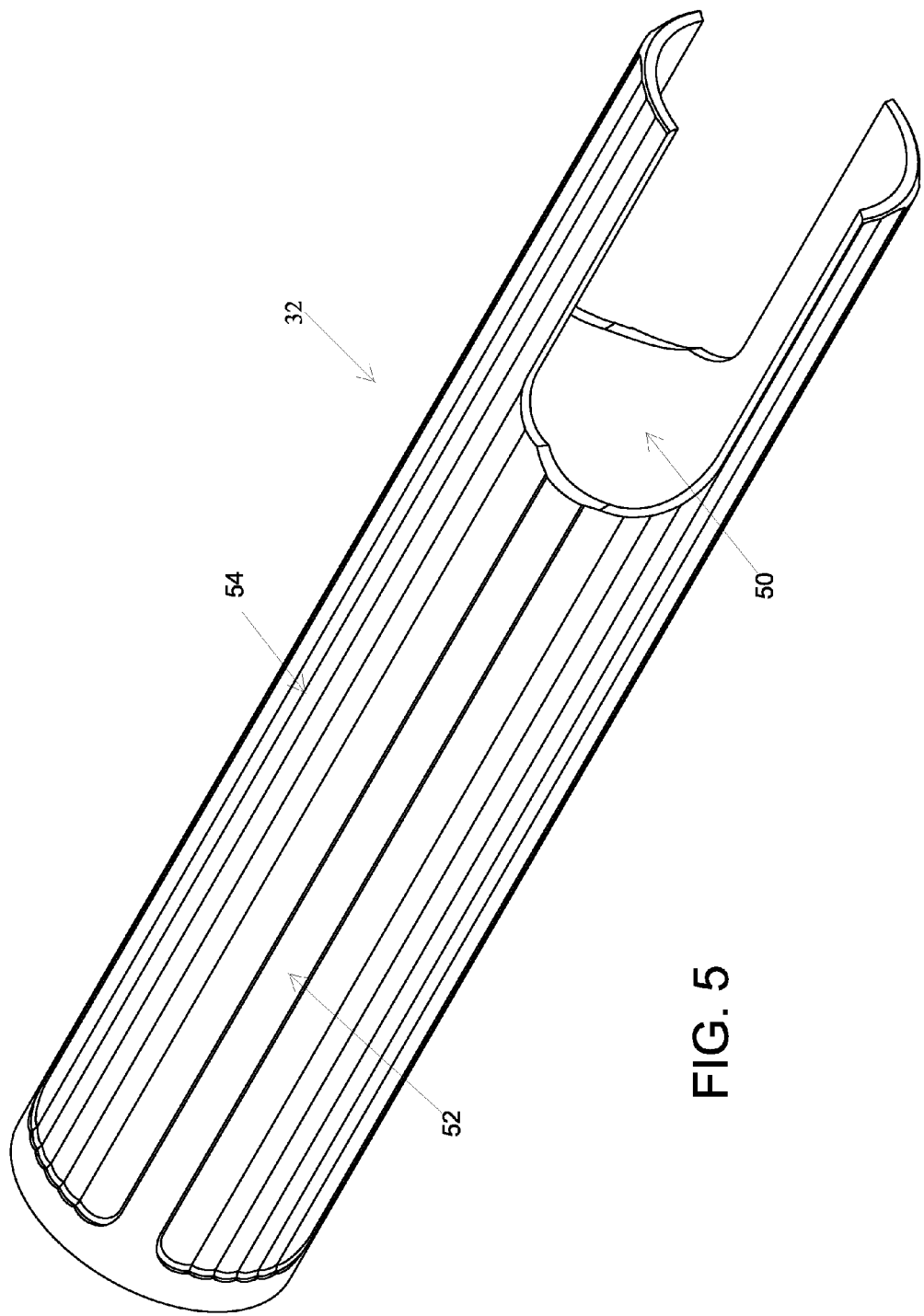
FIG. 5 is a perspective view of the coolant containment sleeve according to an example of the drilling system.

Turning to FIG. 5, there is shown the coolant containment sleeve 32 in more detail. The coolant containment sleeve 32 has a sleeve inside diameter (ID) 50 that allows it to mate the sleeve ID 50 over the hollow inner body 34 and provides the sealed area necessary for controlled flow of coolant to the cutting insert 13 via the through coolant channels 44. The ID 50 of the sleeve contains the coolant flow within the coolant channels 44 of the hollow inner body 34 and to the nose of the tool 10. The coolant containment sleeve 32 also has a sleeve outside diameter (OD) 52: The OD 52 of the sleeve may be precision ground and provided with a wear resistant area for use in a bushing 70, as shown in FIG. 8. The wear resistant area is accomplished by the addition of chrome or carbide to the OD 52. By utilizing a bushing 70 to guide the drill, improved hole accuracy, repeatability and overall drill performance can be achieved. There is also provided one or more air intake channels 54 formed on the sleeve OD 52 which provide area for air intake through the bushing and into the hole being drilled. This air intake into the hole provides circulation for proper function of the vacuum system. The channels 54 also provide reduced contact area in the bushing to decrease the amount of heat generated and increase cooling from the air flow through the bushing.

Figure 6:
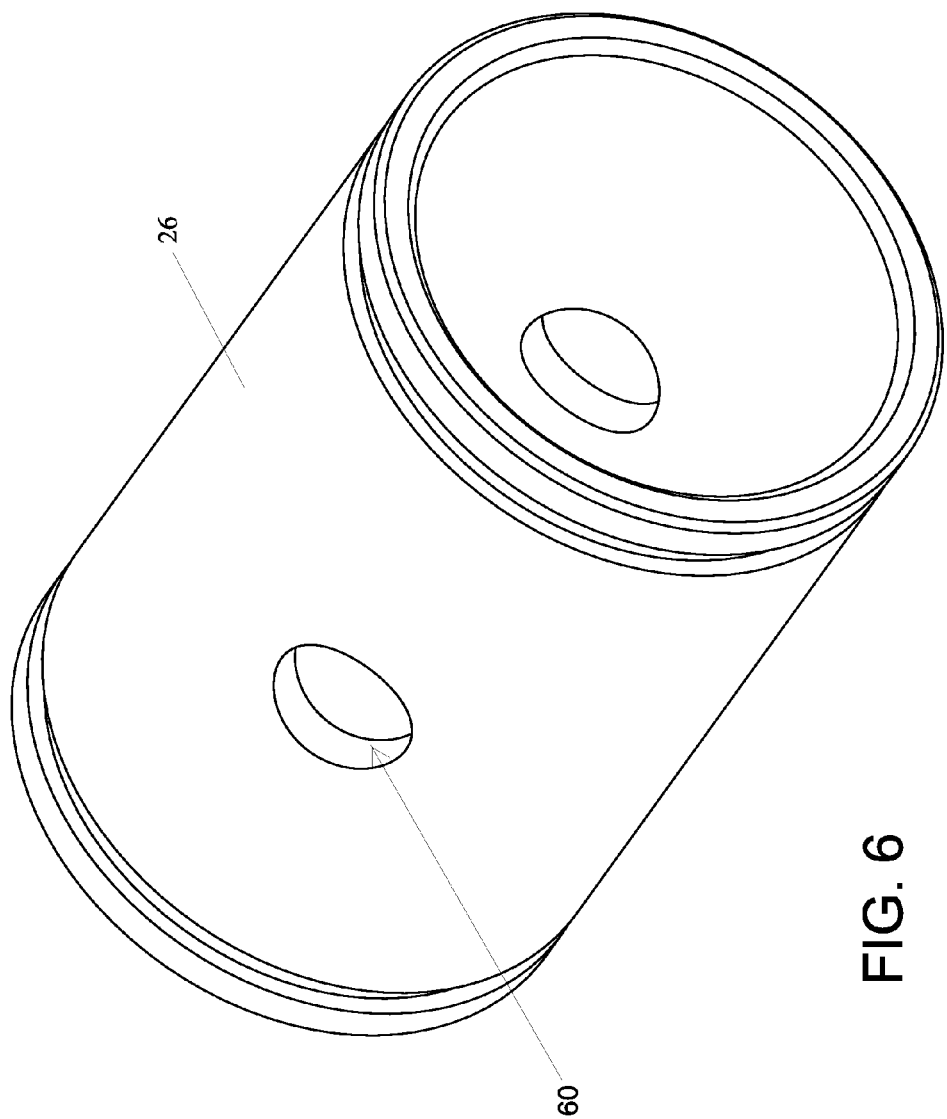
FIG. 6 is a perspective view of the coolant inducer sleeve according to an example of the drilling system.
Figure 7:
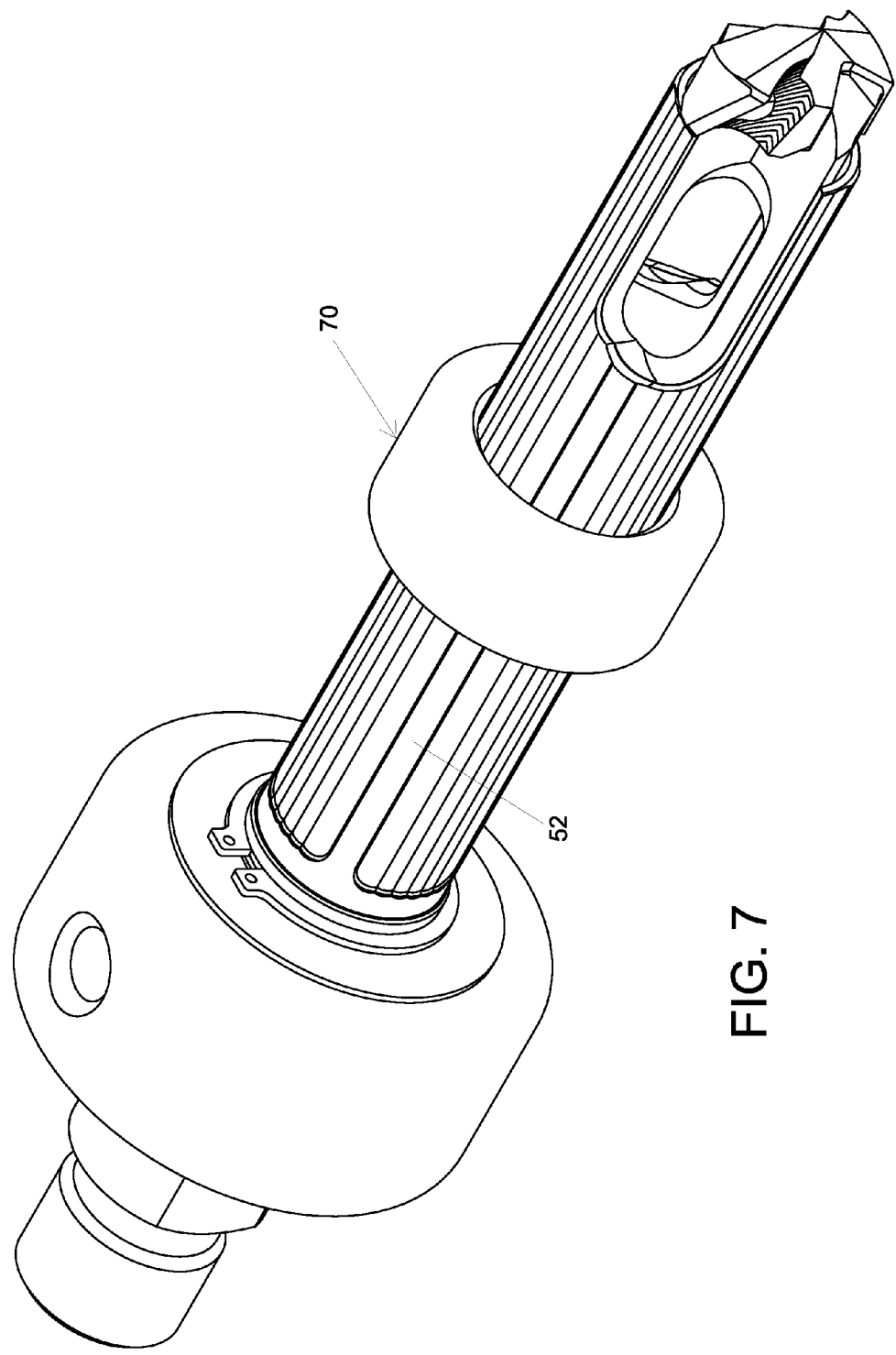
FIG. 7 is a perspective view of the drilling system in conjunction with a bushing according to an example.

As seen in FIG. 6, the coolant inducer sleeve 26 is shown in more detail. The inducer sleeve 26 ID is mated over the hollow inner body 34 and provides the sealed area necessary for controlled flow of coolant to the cutting insert. The ID of the coolant inducer sleeve 34 contains coolant flow within the coolant channels of the hollow inner body 34 and to the coolant containment sleeve 32. The inducer sleeve 26 OD provides a location for assembly of the rotary coolant adapter 22 (see FIG. 1) to the drill 10. The coolant inducer sleeve 26 may further include one or more coolant ports 60 to provide a direct route for coolant flow into the coolant channels 44 of the hollow inner body 34. By providing this direct route of flow from the drill OD, the size of the central extraction hole 42 is not restricted. Other coolant port designs require decreasing the central extraction hole size, which negatively affects the chip removal capabilities of the drilling system.

In operation, the tool 10 of the invention provides significant benefits achieved by a combination of utilizing vacuum drilling technology and adding a through coolant delivery system which effectively extracts metallic materials chips produced by the cutting insert 13. The coolant delivery system allows for effective use of tool 10 in metal drilling applications, and for use with continuous chip forming materials. At the same time, the tool 10 is cost-effective to manufacture, allows significant flexibility for use in different applications, and performs reliably. It should also be recognized that the ability of drill 10 to contain chips and coolant within the hollow inner body eliminates the need for a cleanup operation after drilling. Additionally, health and safety hazards associated with drill operators being exposed to evacuated material are limited. The insert connection system 36 allows for a range of insert diameters and cutting geometries to be interchanged on a single drill body. The connection also allows for quick replacement of worn cutting inserts. This avoids the need with solid twist drills for example, to grind or re-grind to one diameter and a specific cutting geometry. Once a solid twist drill is worn, it must be sent to be reground before another use. The drill 10 eliminates the need for a large inventory of solid twist drills that are required to cover all needed diameters and cutting geometries. Even further, the tool 10 provides a through coolant design which allows for use with a vacuum system. The design allows vacuum drilling technology to be used successfully in a larger variety of applications. For example, instead of CFRP materials, metal drilling that could not previously be accomplished with vacuum technology is now successfully drilled with tool 10. In industries using different materials, such as the aerospace industry, efficient drilling of metals can be accomplished using the through coolant technology of drilling system 10. The configuration provides significant benefits over previous drill designs that do not keep the metal chips and coolant contained within a sealed chip extraction system. The vacuum may be applied via a hose coupling (not shown) for coupling to a vacuum hose for example. The hose coupling allows the tool to rotate relative to the vacuum hose while maintaining a substantially airtight coupling therebetween. A vacuum can thus be applied through the interior of the tool 10 to an area proximate to the cutting features of the drill, to thereby draw chips away from the cutting features of the drill. The vacuum source can be a conventional vacuum source familiar in the art. In the drilling system 10, the central extraction hole and coolant channel size on the drilling system 10. Coolant and vacuum force/flow recommendations will also be included, although the drill should not be considered limited to running within these conditions only.

Tool performance may be enhanced by providing the drill system 10 with the largest feasible size for the central extraction hole 46. A larger diameter hole 46 will evacuate chips at a faster rate and be less likely to pack with chips. Hole size is limited by other features on the drill, as there cannot be interference between the central hole and these other features. Depending on the drill diameter, features typically limiting the central hole size are either the through coolant channels or shank diameter. As the system 10 may be run on portable drilling machines at relatively light feed rates, drill failure due to excessive cutting forces may not be a significant concern. Further, maximizing the coolant channel size also may benefit performance in the drilling system 10. A larger coolant channel will flow more coolant and benefit the drilling operation by better cooling/lubricating the at least one cutting insert 13 and helping the vacuum to extract chips. In the example shown, drill features which may limit the size of the coolant channel may be the cutting insert screw threads and size of the cutting insert drive ears in the slotted connection. Other connections may not be so limited.

In an example, recommended vacuum CFM and static pressures may be as follows:
 175-225 CFM
 55"-65" static pressure
Recommended coolant pressure (such as a typical shop air supply):
 80-100 PSI,
but other suitable configurations for a particular application are within the invention. In operation, when the tool 10 is selectively connected to a vacuum source and a coolant source, the tool 10 provides both a through tool coolant supply as well as a central vacuum extraction system. The drilling system 10 allows for vacuum pressure to be applied at the location of cutting insert 13 to draw any cuttings, contaminants and coolant fluids away from the cutting area. The vacuum extracts such materials to exit through the shank of tool 10. In this manner, a method of vacuum drilling is provided by providing a drilling tool having a cutting head adjacent a front end of the system having at least one cutting edge formed thereon, and a hollow shaft with a plurality of openings adjacent the cutting head. The hollow shaft includes sealed through coolant channels coupled to a source of coolant fluid, and a vacuum source is applied to the hollow tube. To facilitate desired vacuum extraction, the openings as well as the diameter of the interior chamber of the hollow tube 34 are sized to accommodate the largest expected chips so as avoid blockage. The edges of the openings may be grooved, smoothed or radiused for improved air and chip flow.

It should be recognized in the drilling system of the invention, that the present invention is not limited to the exemplary drill system as shown. The configuration described herein and the particulars thereof can be readily applied to a variety of systems and applications. It is therefore understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A drilling system for performing a drilling operation, comprising a body member, a cutting head at the front end of the body member having cutting edges formed thereon to drill a hole in a workpiece, the body member having a central hollow region, and the body member having an outside diameter, the hollow region extending through the body member to the cutting head with at least one opening in the body member adjacent the cutting head, a coolant adapter to provide a coolant fluid through first and second sealed channels on the outside diameter of the body member exterior to the central hollow region, the channels formed by a coolant containment system mated to the exterior of the body to create the first and second sealed channels, the first and second channels providing a, controlled flow of a coolant fluid to the area of the at least one cutting edge, and the containment system further providing one or more air intake channels, and a vacuum source connected to the central hollow region to apply vacuum pressure through the at least one opening and hollow region.

2. The drilling system of claim 1 wherein the coolant containment system includes a containment sleeve mated to a coolant inducer sleeve positioned on the exterior of the hollow body member that together create the first and second sealed channels.

3. The drilling system of claim 1 wherein the first and second cutting edges are provided by at least one replaceable cutting insert mounted in association with the cutting head.

4. The drilling system of claim 3 wherein the first and second cutting edges extending from a position along the rotational axis of the drilling system for double effective cutting.

5. The drilling system of claim 4 wherein openings are provided on the body member to provide an entrance for chips into the hollow region from each cutting edge.

6. The drilling system of claim 2 wherein the coolant inducer sleeve has an inside diameter that contains coolant flow within coolant channels formed on the exterior of the body member and the coolant containment sleeve has an inside diameter to contain coolant flow within the coolant channels formed on the exterior of the body member.

7. The drilling system of claim 2 wherein the coolant inducer sleeve has an opening for passage of coolant from a rotary coolant adapter coupled to the coolant inducer sleeve.

8. The drilling system of claim 7 wherein the coolant inducer sleeve further includes one or more coolant ports for coolant flow into the coolant channels formed on the body member.

9. The drilling system of claim 2 wherein the coolant containment sleeve has an outside diameter provided with a wear resistant area over at least a portion thereof, and further comprising a bushing mounted on the wear resistant area.

10. A method of performing a drilling operation comprising providing a drilling tool having a cutting head at a front end of the tool having cutting edges extending from the rotational axis, and a body member having a hollow central region with at least one opening adjacent the cutting head and first and second channels formed on the outer diameter, and a containment sleeve mated to a coolant inducer sleeve positioned on the exterior of the body member, and providing a coolant adapter to allow a flow of coolant from a coolant source through the coolant inducer sleeve and into the first and second channels formed on the body member and sealed by the containment sleeve mated to a coolant inducer sleeve and wherein the containment sleeve includes one or more air intake channels,
 supplying a source of coolant fluid to the coolant adapter and through the sealed channels to the area of the cutting head, and
 coupling a vacuum source to the hollow central region to extract cuttings formed at the cutting head and the coolant fluid supplied to the area of the cutting head through the sealed channels.

11. The method of claim 10 further comprising providing an article for machining formed of a continuous chip forming material and mounting the drilling tool in a machining system and machining the article.

12. The method of claim 10 further comprising providing a positive feed and peck machining system and mounting the drilling tool therein and machining an workpiece.

13. The drilling system of claim 9, wherein the bushing provides for air intake to the air intake channels formed on the outside of the containment sleeve and into the hole being drilled.

14. The method of claim 10 wherein the containment sleeve has an outside diameter provided with a wear resistant area over at least a portion thereof, and further comprising providing a bushing mounted on the wear resistant area to supply air to the air intake channels formed on the containment sleeve during the machining operation.

* * * * *